(12) United States Patent  
Williams

(10) Patent No.: US 8,636,445 B1
(45) Date of Patent: Jan. 28, 2014

(54) HAZARDOUS SPILL GROUND CONTAINMENT SYSTEM

(76) Inventor: Floyd E. Williams, Grand Junction, CO (US)

( * ) Notice: Subject to any disclaimer, the term of this patent is extended or adjusted under 35 U.S.C. 154(b) by 0 days.

(21) Appl. No.: 13/481,910

(22) Filed: May 28, 2012

(51) Int. Cl.
*E02B 7/08* (2006.01)

(52) U.S. Cl.
USPC .............. 405/114; 405/60; 405/107; 220/9.4

(58) Field of Classification Search
USPC ................. 405/114, 107, 60; 220/9.4; 52/247
See application file for complete search history.

(56) References Cited

U.S. PATENT DOCUMENTS

| | | | | |
|---|---|---|---|---|
| 4,765,775 A | * | 8/1988 | Kroger | 405/52 |
| 5,116,300 A | * | 5/1992 | Pildysh | 405/107 |
| 5,400,555 A | * | 3/1995 | Kantor | 52/169.7 |
| 5,454,195 A | * | 10/1995 | Hallsten | 52/169.1 |
| 5,547,312 A | * | 8/1996 | Schmitz, Jr. | 405/52 |
| 5,775,869 A | * | 7/1998 | Bishop | 414/608 |
| 5,782,583 A | * | 7/1998 | Vales | 405/281 |
| 5,816,743 A | * | 10/1998 | Schmitz, Jr. | 405/53 |
| 6,431,387 B2 | * | 8/2002 | Piehler | 220/495.01 |
| 6,457,189 B1 | * | 10/2002 | Kindness | 4/506 |
| 7,614,825 B2 | * | 11/2009 | Kroger | 405/107 |
| 2012/0187119 A1 | * | 7/2012 | McAtarian et al. | 220/6 |
| 2013/0017018 A1 | * | 1/2013 | Allen et al. | 405/114 |

* cited by examiner

*Primary Examiner* — Thomas B Will
*Assistant Examiner* — Katherine Chu
(74) *Attorney, Agent, or Firm* — Edwin H. Crabtree; Ramon L. Pizarro

(57) ABSTRACT

A hazardous spill ground containment system having a plurality portable metal frame sections. The frame sections are used to create an angular shaped containment frame received over various types of ground surfaces. The frame sections can be made to different lengths and heights and are used for holding in place a heavy duty liner on top of the ground surface. The liner is adapted for receiving various types of equipment, tanks and containers holding toxic chemicals and the like hazardous materials. The metal frame sections include an elongated, metal, A-shaped lower frame member and an elongated, metal, Z-shaped upper frame member for receiving and holding a side of the liner securely in place.

19 Claims, 4 Drawing Sheets

HAZARDOUS SPILL GROUND CONTAINMENT SYSTEM

BACKGROUND OF THE INVENTION (a) Field of the Invention

This invention relates to a containment system for collecting and holding in place a leaking hazardous material and more particularly, but not by way of limitation, to a hazardous spill ground containment system. The system used for placing on a ground surface and under and around equipment, tanks and storage containers used during and after an oil and gas drilling operation. Also, the system can be used in other industries for similar applications.

(b) Discussion of Prior Art

Heretofore, little thought has been given to leakage of chemicals and toxic materials in and around an oil and gas drilling operation, tank farms and the like. But, with today's environmental concerns related to the possibility of a hazardous material contaminating a ground surface, leaking into nearby ponds, streams and lakes, migrating into an underground aquifer, killing wildlife and damaging foliage, new environmental laws and regulations, passed by the EPA, now require the oil and gas industry to include some type of ground containment system around a drilling site to collect spillage before it contacts the ground surface or face a large fine and/or stopping the operation.

Currently, ground containment barriers are built with an earth berm or straw bales and the like and disposed around drilling equipment and storage tanks with a heavy tarp spread across the ground surface with the sides of the tarp received over the top of the berm or the straw bales. This type of structure is obviously not portable, reusable or particularly reliable. Also, this type of structure doesn't hold the tarp securely in place on the ground surface.

The subject invention provides for a high strength, light weight metal, portable, variable size, ground containment system that can be quickly assembled for holding a heavy liner securely on the ground surface. The system can then be disassembled for reuse when the drilling operation is completed.

SUMMARY OF THE INVENTION

In view of the foregoing, it is a primary objective of the subject invention to provide a portable containment system, which is made of light weight metal frame sections, such as aluminum, that can be quickly assembled and disassembled for continued reuse.

Another object of the invention is the metal frame sections can be made in different lengths, widths and heights for creating various sizes of an angular-shaped containment area. The containment area can be used for covering various types of ground surfaces.

Still another object of the containment system is the metal frame sections hold a heavy liner securely on a ground surface to prevent movement of the liner when equipment is placed thereon and prevent movement of the liner during cleanup of a toxic spill.

Yet another key advantage of the containment system is it eliminates the need for pit excavation and land reclamation and without requiring a permanent permit for its use.

Still further, the portable containment system can be used not only in the gas and oil industry, but in other industries where equipment and tanks are subject to toxic spills on different types of indoor and outdoor surfaces.

The subject hazardous spill ground containment system includes a plurality portable metal frame sections. The frame sections can be made to different lengths and heights and are used for holding in place a heavy duty, heat sealable liner on top of a ground surface. The liner is adapted for receiving various types of equipment, tanks and containers holding various types of toxic chemicals and like hazardous materials.

The metal frame sections include an elongated, metal, A-shaped lower frame member. The lower frame member includes a horizontal top portion, an interior angled side portion with an interior horizontal flange and an exterior vertical side portion with an exterior horizontal flange with "L" shaped lip. An A-frame coupling is used to connected ends of adjacent A-shaped lower frame members for completing an angular shaped containment area frame.

During the assembly of the system, sides of the liner are draped against the interior angled side portion, over the horizontal top portion, next to the vertical exterior side portion and on top of the horizontal exterior flange of the A-shaped lower frame member.

When the liner is in place, a Z-shaped, elongated upper frame member is received over the liner on top of the A-shaped lower frame member. The Z-shaped, upper frame member includes a horizontal top portion, a vertical side portion and a horizontal bottom portion. The horizontal top portion of the upper frame member is received on top of the horizontal top portion of the lower frame member, with a portion of a side of the liner between the frame members. The vertical side portion of the Z-shaped upper frame is received next to the vertical side portion of the A-shaped lower frame member, also with a portion of the side of the liner disposed therebetween. The horizontal bottom portion of the Z-shaped upper frame member is received on top of the exterior flange of the A-shaped lower frame member. Retention bolts in the top of the "L" shaped lip are now used to compress an assembly bar and hold the side of the liner securely between the A-shaped lower frame member and the Z-shaped upper frame member.

These and other objects of the present invention will become apparent to those familiar with various types of outdoor and indoor containment systems used to hold and contain spillage of hazardous liquids and material and prevent contaminating a ground or floor surface when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for the practical application of the subject ground containment system for collecting and holding spilled hazardous materials, and in which.

DETAILED DESCRIPTION OF THE PREFERRED EMBODIMENTS

Figure 1:
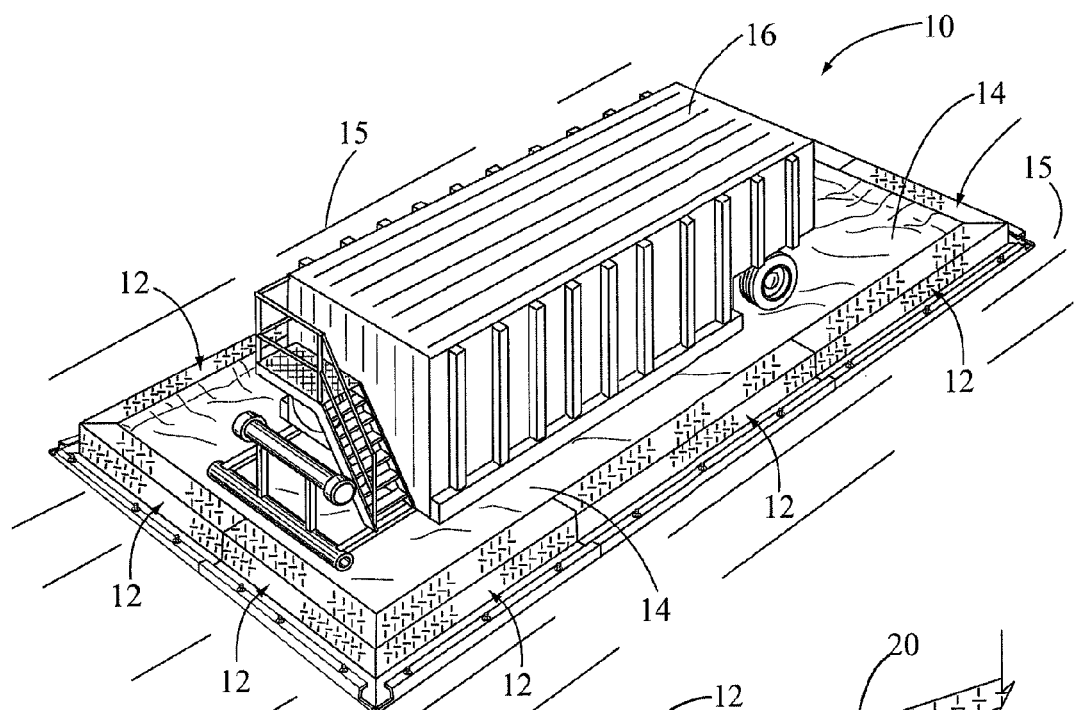
FIG. 1 is a perspective view of the subject ground containment system and shown surrounding a large portable storage container used to hold chemicals used in an oil and gas drilling and fracing operation.

In FIG. 1, the subject hazardous spill ground containment system is shown having general reference numeral 10. The ground containment system 10 includes a plurality of portable metal frame sections having a general reference numeral 12. The frame sections 12 can be made to different lengths, such as 2, 4, 8, 10, 12, and 20 feet or longer, and different heights, such as 6, 8, 12, 15 inches or higher. The frame sections 12 are used for creating an angular-shaped containment area frame. The area frame used for holding in place sides of a heat sealable, heavy duty liner 14 on top of a ground surface 15. The liner 14 is adapted for receiving thereon various types of equipment, tanks and containers holding various types of toxic chemicals and like hazardous materials. In this drawing, the ground containment system 10 is disposed around and under a large, portable storage container 16, holding chemicals used in an oil and gas fracing operation.

Figure 2:
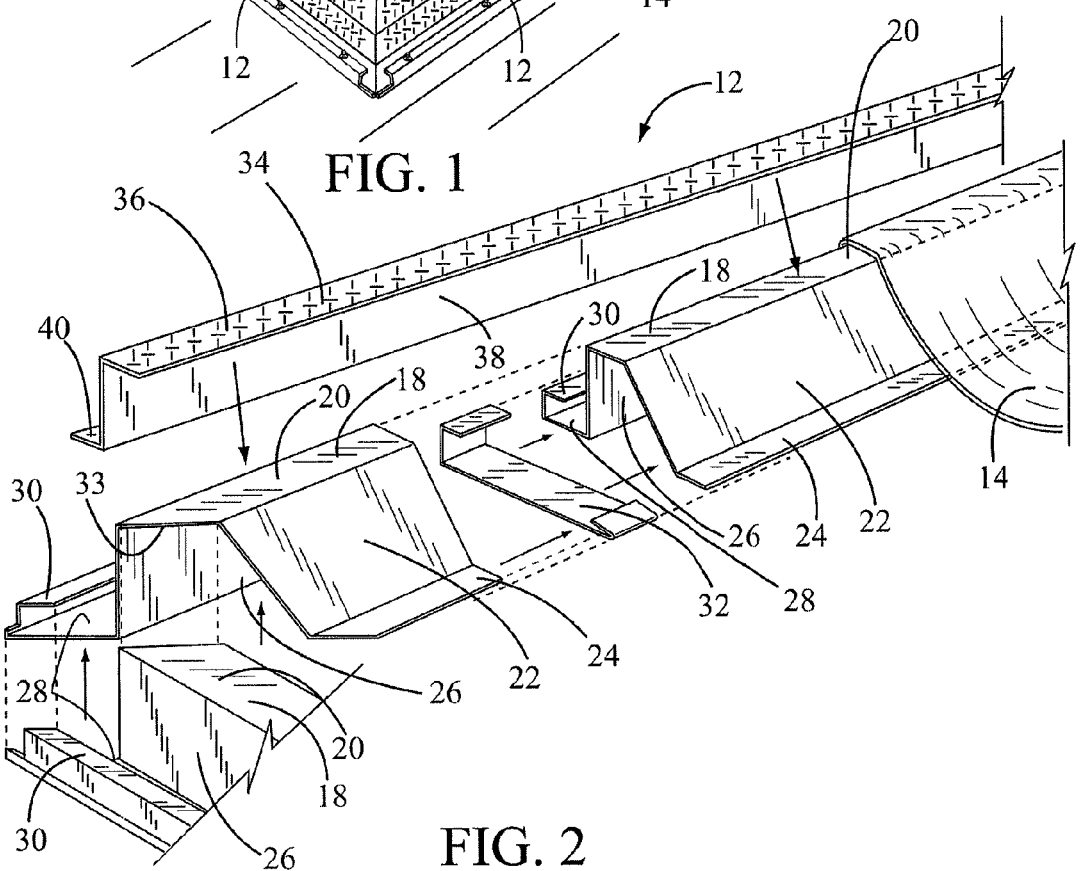
FIG. 2 is a perspective view of a section of an A-shaped lower frame member and a Z-shaped upper frame member with a portion of a heavy duty liner received over the lower frame member.

In FIG. 2, the metal frame sections 12 include an elongated, metal A-shaped lower frame member 18. The lower frame member 18 includes a horizontal top portion 20, an interior angled side portion 22, an interior horizontal flange 24, an exterior vertical side portion 26 with an exterior horizontal flange 28 with an "L" shaped lip 30. An A-frame coupling 32 is used to connect ends of adjacent lower A-shaped lower frame members 18. Also shown in this drawing are two beveled ends 33 of two of the frame members 18 cut at a 45 degree angle for completing a 90 degree corner of the frame made up using the two lower frame members 18. These frame members 18 can be made in shorter sections with the beveled ends 33 welded together for making up four corner sections of the system 10.

In this drawing, a portion of the liner 14 is shown draped against the interior angled side portion 22, over the horizontal top portion 20 and next to the exterior vertical side portion 26 of the A-shaped lower frame member 18. The interior angled side portion 22 is angled in a range of 45 to 60 degrees from the horizontal and angled similar to a sloping side of a pond or a stream bed.

Also, the metal frame sections 12 includes a Z-shaped, elongated upper frame member 34. The upper frame member 34 includes an anti-slip surface for safety, as shown in the drawings. Each of the upper frame members 34 include a horizontal top portion 36, a vertical side portion 38 and a horizontal bottom portion 40. The horizontal top portion 36 is received on top of the horizontal top portion 20 of the lower frame member 18, with a portion of the liner 14 received between the two top portions. Also, the vertical side portion 26 of the A-shaped lower frame member 18 is received next to the vertical side portion 38 of the Z-shaped upper frame member 34, with a portion of the side of the liner 14 disposed therebetween. Further, the horizontal bottom portion 40 of the Z-shaped upper frame member 34 is received on top of the exterior horizontal flange 28 of the A-shaped lower frame member 18.

Figure 3:
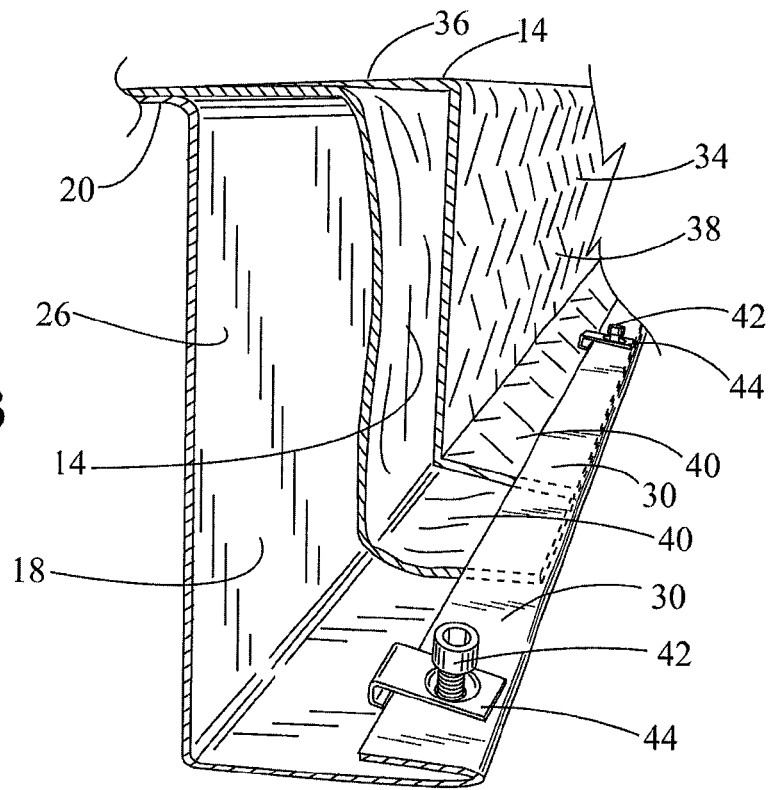
FIG. 3 is perspective view of a section of the A-shaped lower frame member and the Z-shaped upper frame member with an edge of a side of the liner received inside a "L" shaped lip in the lower frame member.

In FIG. 3, an enlarged perspective view of a section of the A-shaped lower frame member 18 and the Z-shaped upper frame member 34 are shown. An edge of a portion of a side of the liner 14 is shown received inside the "L" shaped lip 30 in the lower frame member 18.

In this drawing, retention bolts 42, with bolt clips 44, are shown spaced apart on top of the "L" shaped lip 30. The bolts 42 are used to hold in place the Z-shaped upper frame member 34. When the bolts 42 are tightened on the lip 30, the Z-shaped upper frame member 34 compresses and holds the side of the liner 14 securely between the A-shaped lower frame member 18 and the Z-shaped frame member 36.

Figure 4:
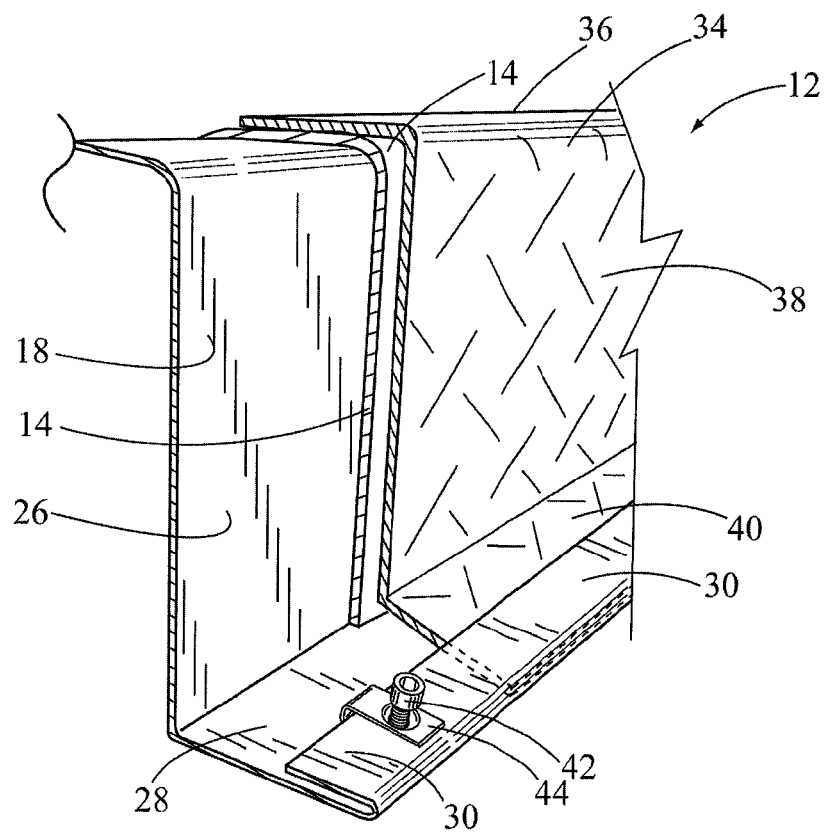
FIG. 4 is another perspective view, similar to FIG. 3, of a section of the A-shaped lower frame member and the Z-shaped upper frame member with an edge of a side of the liner received and compressed between the exterior vertical side portion of the A-shaped lower frame member and the vertical side portion of the Z-shaped upper frame member

In FIG. 4, another perspective view, similar to FIG. 3, of a section of the A-shaped lower frame member 18 and the Z-shaped upper frame member 34 are shown and with an edge of a side of the liner 14 received and compressed between the exterior vertical side portion 26 of the A-shaped lower frame member 18 and the vertical side portion 38 of the Z-shaped upper frame member 34.

Figure 5:
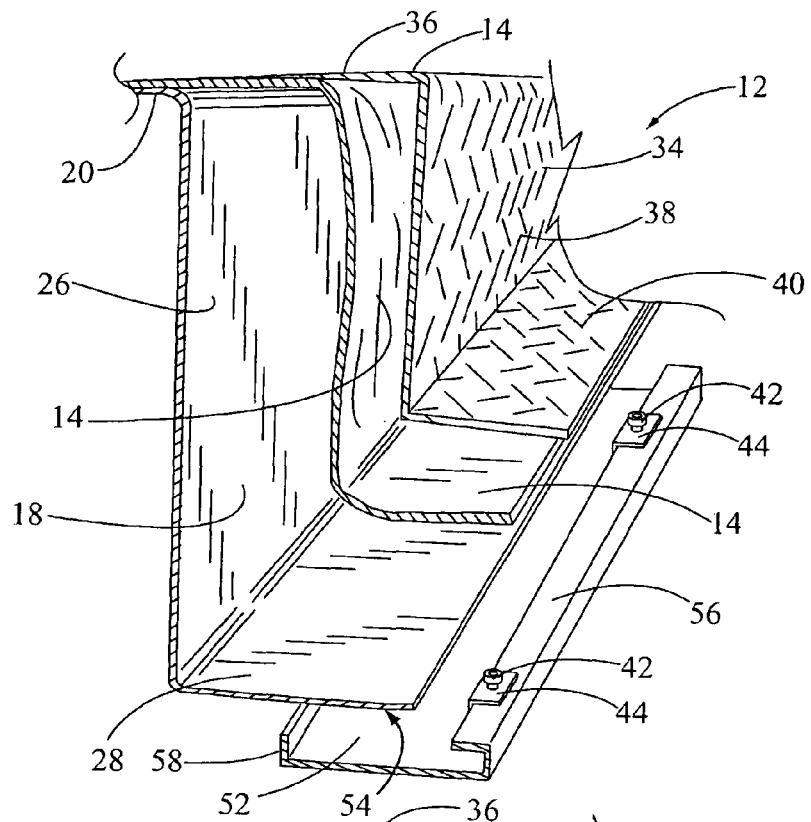
FIGS. 5 and 6 illustrate another embodiment of the A-shaped lower frame member with a separate retention plate for securing the Z-shaped upper frame member and liner thereon.

In FIG. 5, another embodiment of the A-shaped lower frame member 18 is illustrated and without the "L" shaped lip 30. In this embodiment, a separate retention plate 52 is shown having a horizontal base 54 dimensioned for receipt next to the bottom of the exterior horizontal flange 28 of the lower frame member 18. The horizontal base 54 includes a "L" shaped lip 56 with retention bolts 42 and bolt clips 44.

Figure 6:
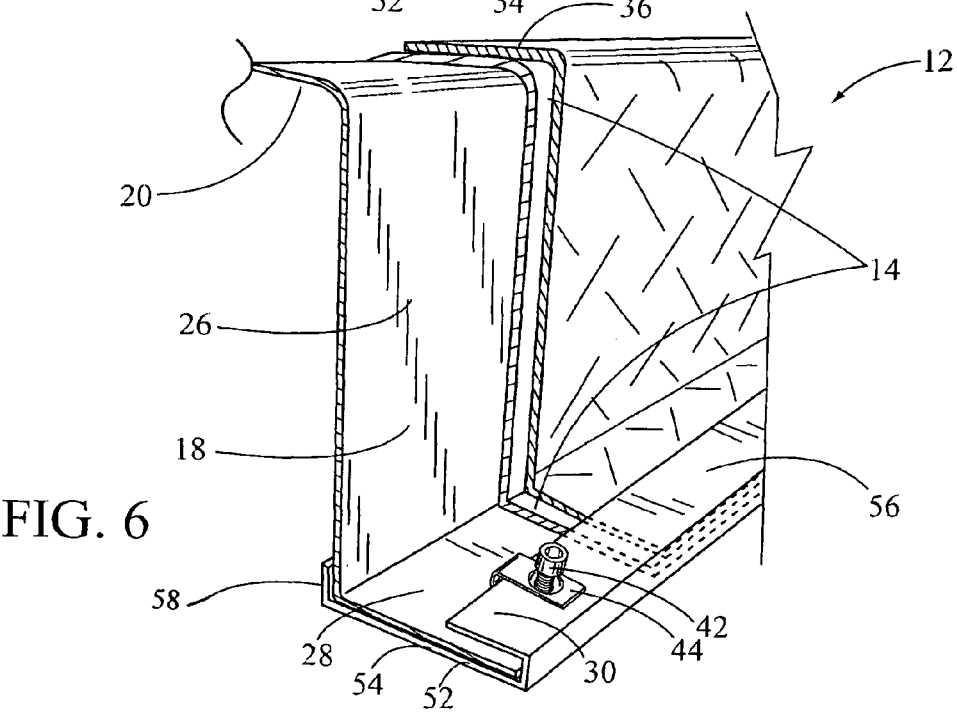

In FIG. 6, the retention plate 52 is shown mounted next to the bottom of the exterior horizontal flange 28 and the "L" shaped lip 56 received the edge of the horizontal bottom portion 40 of the "Z" shaped upper frame member 34 and the edge of a side of the liner 14. The retention bolts 42 are now tightened to secured the Z-shaped upper frame member 34 and liner 14 on the A-shaped lower frame member 18. The retention plate 52 can also include a vertical flange 58, shown in dashed lines, disposed next to a lower portion of the exterior vertical side portion 26 to help hold the retention plate 52 in place next to the exterior horizontal flange 28 of the A-shaped lower frame member 18.

Figure 7:
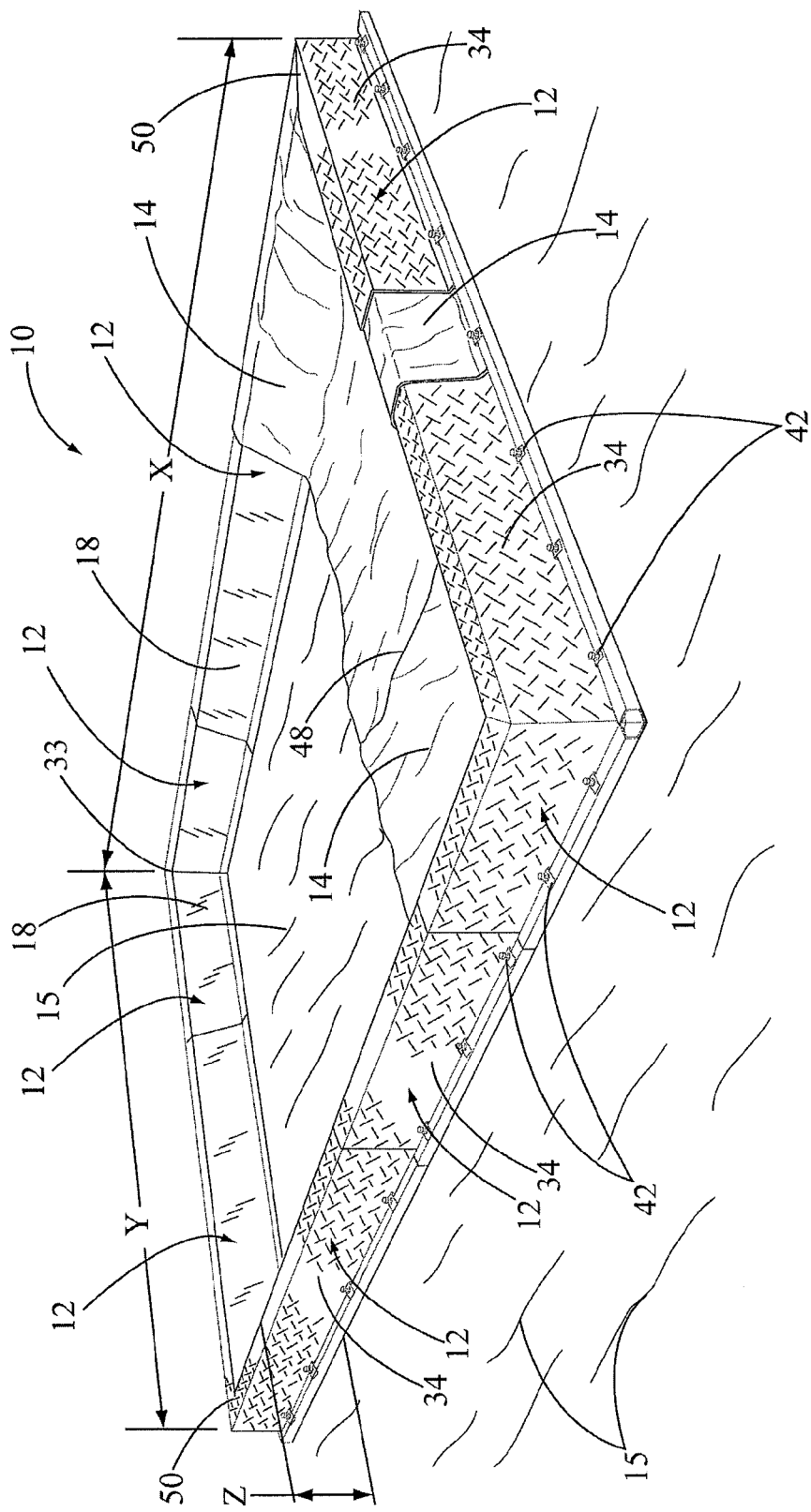
FIG. 7 is a perspective view, similar to FIG. 1, of the ground containment system illustrating the metal frame sections and a portion of the heavy duty liner received on the ground surface and prior to completing the installation of the liner.

In FIG. 7, a perspective view, similar to FIG. 1, of the ground containment system is illustrated with the metal frame sections 12 and a portion of the heavy duty liner 14 received on the ground surface 15 and prior to completing the installation of the liner 14. On the right side of the drawing, a pair of liners 14 are shown with one of the liners 14 held in place between the A-shaped metal lower frame member 18 and the Z-shaped metal upper frame member 34. Also, sides of the two liners 14 are shown having a heat seal 48 for joining together the sides of the liners and preventing any leakage between the adjacent liners and into the ground surface 15 during the use of the ground containment system 10. In this drawing it should be noted, the corners of the Z-shaped upper frame members 34 include beveled ends 50. The ends 50 are cut at a 45 degree angle for making a 90 degree corner angle. The beveled ends 50 are similar to the beveled ends 33 on the A-shaped lower frame members 18.

In this drawing, a length "X" of the ground containment system 10 is shown. The length X, for example, can be in a range of 18 feet in length using three 6 feet sections 12, or 24 feet in length using three 8 feet sections 12, or 36 feet in length using three 12 foot sections 12 and greater. Also, a width "Y", for example, can be in a range of 12 feet in width using two 6 feet sections, or 16 feet in width using two 8 feet sections 12, or 24 feet in width using two 12 foot sections or greater. Further, the frame sections 12 can have a height "Z" in a range of 6 to 12 inches and greater. Obviously, the frame sections 12 can be various lengths without departing from the spirit and scope of the invention and used for creating the angular-shaped container area for holding the liner 14 in place.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A hazardous spill ground containment system adapted for receipt on a ground surface, the system comprising:
   a heavy duty liner adapted for receipt on top of the ground surface, the liner adapted for receiving various types of equipment, tanks and containers holding various types of toxic chemicals and like hazardous materials;
   a plurality of portable metal frame sections, the frame sections made to different lengths and heights, opposite ends of each frame sections are joined together to form an angular-shaped containment area frame; the frame sections including:
   an elongated, metal, A-shaped lower frame member, the lower frame member having a horizontal top portion, an interior angled side portion, an exterior vertical side portion and an exterior horizontal flange;
   an elongated, metal, Z-shaped upper frame member, the upper frame member having a horizontal top portion, a vertical side portion and a horizontal bottom portion, the upper frame member disposed on top of the lower frame member with a portion of the side of the heavy duty liner secured therebetween; and
   a retention plate, the retention plate including a horizontal base with an "L" shaped lip, the horizontal base of the retention plate received against a bottom of the exterior horizontal flange of the lower frame member.

2. The system as described in claim 1 wherein the A-shaped lower frame member includes a member includes an "L" shaped lip on the exterior horizontal flange.

3. The system as described in claim 1 further including retention bolts disposed in a top of the "L" shaped lip of the retention plate, the retention bolts used to compress and hold the side of the liner securely between the A-shaped lower frame member and the Z-shaped upper frame member.

4. The system as described in claim 1 further including an A-frame coupling used to connect ends of adjacent A-shaped lower frame members for completing the angular-shaped containment area frame.

5. The system as described in claim 1 wherein ends of a pair of A-shaped lower frame members used in a corner of the angular-shaped containment area frame are cut at a 45 degree angle to provide a 90 degree beveled corner angle when completing the angular-shaped containment area frame.

6. The system as described in claim 5 wherein ends of a pair of Z-shaped upper frame members used in a corner of the angular-shaped containment area frame are cut at a 45 degree angle to provide a 90 degree beveled corner angle when completing the angular-shaped containment area frame.

7. A hazardous spill ground containment system adapted for receipt on a ground surface, the system comprising:
   a heavy duty, heat sealable liner adapted for receipt on top of the ground surface, the liner adapted for receiving various types of equipment, tanks and containers holding various types of toxic chemicals and like hazardous materials;
   a plurality of portable metal frame sections, the frame sections made to different lengths and heights, opposite ends of each frame sections are joined together on form an angular-shaped containment area frame; the frame sections including:
   an elongated, metal, A-shaped lower frame member, the lower frame member having a horizontal top portion, an interior angled side portion, an exterior vertical side portion, and an exterior horizontal flange with "L" shaped lip;
   an elongated, metal, Z-shaped upper frame member, the upper frame member having a horizontal top portion, a vertical side portion and a horizontal bottom portion, the upper frame member disposed on top of the lower frame member with a portion of the side of the liner secured therebetween; and
   retention bolts disposed in the top of the "L" shaped lip, the retention bolts used to compress and hold the side of the liner securely between the A-shaped lower frame member and the Z-shaped upper frame member.

8. The system as described in claim 7 further including an A-frame coupling used to connect ends of adjacent A-shaped lower frame members for completing an angular-shaped containment area frame.

9. The system as described in claim 7 wherein ends of a pair of A-shaped lower frame members used in a corner of the angular-shaped containment area frame are cut at a 45 degree angle to provide a 90 degree beveled corner angle when completing the angular-shaped containment area frame.

10. The system as described in claim 9 wherein ends of a pair of Z-shaped upper frame members used in a corner of the angular-shaped containment area frame are cut at a 45 degree angle to provide a 90 degree beveled corner angle when completing the angular-shaped containment area frame.

11. The system as described in claim 7 wherein the frame sections have a length in a range of 8 to 20 feet.

12. The system as described in claim 7 wherein the frame sections have a height in a range of 6 to 15 inches.

13. A hazardous spill ground containment system adapted for receipt on a ground surface, the system comprising:
   a heavy duty liner adapted for receipt on top of the ground surface, the liner adapted for receiving various types of equipment, tanks and containers holding various types of toxic chemicals and like hazardous materials;
   a plurality of portable metal frame sections, the frame sections made to different lengths and heights, opposite ends of each frame sections are joined together to form an angular-shaped containment area frame; the frame sections including:
   an elongated, metal, A-shaped lower frame member, the lower frame member having a horizontal top portion, an interior angled side portion, an exterior vertical side portion and an exterior horizontal flange;
   an elongated, metal, Z-shaped upper frame member, the upper frame member having a horizontal top portion, a vertical side portion and a horizontal bottom portion, the upper frame member disposed on top of the lower frame member with a portion of the side of the heavy duty liner secured therebetween;
   a retention plate, the retention plate including a horizontal base with an "L" shaped lip, the horizontal base of the retention plate received against a bottom of the exterior horizontal flange of the lower frame member; and retention bolts disposed in the top of the "L" shaped lip, the retention bolts used to compress and hold the side of the liner securely between the A-shaped lower frame member and the Z-shaped upper frame member when the horizontal base of the retention plate is received against a bottom of the exterior horizontal flange.

14. The system as described in claim 13 wherein the A-shaped lower frame member includes a member includes an "L" shaped lip on the exterior horizontal flange.

15. The system as described in claim 13 further including an A-frame coupling used to connect ends of adjacent A-shaped lower frame members for completing the angular-shaped containment area frame.

16. The system as described in claim 13 wherein ends of a pair of A-shaped lower frame members used in a corner of the angular-shaped containment area frame are cut at a 45 degree angle to provide a 90 degree beveled corner angle when completing the angular-shaped containment area frame.

17. The system as described in claim 13 wherein ends of a pair of Z-shaped upper frame members used in a corner of the angular-shaped containment area frame are cut at a 45 degree angle to provide a 90 degree beveled corner angle when completing the angular-shaped containment area frame.

18. The system as described in claim 13 wherein the frame sections have a length in a range of 8 to 20 feet.

19. The system as described in claim 13 wherein the frame sections have a height in a range of 6 to 15 inches.

\* \* \* \* \*